(12) United States Patent
Wang et al.

(10) Patent No.: US 7,381,051 B2
(45) Date of Patent: Jun. 3, 2008

(54) CORE-PULLING MECHANISM AND INJECTION MOLD WITH THE SAME

(75) Inventors: Chiang-Chang Wang, Tu-Cheng (TW); Chih-Yu Chen, Tu-Cheng (TW); Jian-Guang Huang, Tu-Cheng (TW); Xiao-Jun Zheng, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 361 days.

(21) Appl. No.: 11/338,386

(22) Filed: Jan. 24, 2006

(65) Prior Publication Data

US 2007/0172539 A1    Jul. 26, 2007

(51) Int. Cl.
*B29C 45/44* (2006.01)

(52) U.S. Cl. ............... 425/577; 425/441; 425/DIG. 58

(58) Field of Classification Search ................ 425/441, 425/556, 572, 577, DIG. 5, DIG. 58
See application file for complete search history.

(56) References Cited

U.S. PATENT DOCUMENTS

| | | | | |
|---|---|---|---|---|
| 2,994,921 | A * | 8/1961 | Hultgren | 425/308 |
| 3,849,053 | A * | 11/1974 | Bruce et al. | 425/438 |
| 4,240,498 | A * | 12/1980 | Frenette | 164/303 |
| 4,768,943 | A * | 9/1988 | Honsa | 425/236 |
| 4,958,676 | A * | 9/1990 | Kuntz | 164/340 |
| 5,135,700 | A * | 8/1992 | Williams et al. | 264/318 |
| 6,116,891 | A * | 9/2000 | Starkey | 425/556 |
| 6,659,760 | B2 * | 12/2003 | Liao et al. | 425/577 |
| 7,121,823 | B2 * | 10/2006 | Chen et al. | 425/438 |
| 7,175,421 | B2 * | 2/2007 | Takemoto et al. | 425/577 |
| 2002/0074694 | A1 * | 6/2002 | Kurimoto | 264/318 |
| 2004/0169320 | A1 * | 9/2004 | Petrucci et al. | 264/328.16 |
| 2004/0247726 | A1 * | 12/2004 | Takemoto et al. | 425/190 |
| 2005/0253301 | A1 * | 11/2005 | Kraenzle | 264/328.1 |

FOREIGN PATENT DOCUMENTS

JP          2006001199 A  *  1/2006

* cited by examiner

*Primary Examiner*—Yogendra N. Gupta
*Assistant Examiner*—Emmanuel S Luk (57) ABSTRACT

A core-pulling mechanism for pulling a slide core and a threaded-pin core in an injection mold includes a hinge shaft having two ends with polygonal cross-section, an shaft sleeve assembled with a rear of the hinge shaft, a baffle block having axial through opening allowing the hinge shaft to pass through and rotate therein, a slider having a through hole for receiving the baffle block and a semi-closed transmission hole defined in a rear wall, a transmission shaft assembled in the transmission hole and fixed to the slider, and a guide block. The baffle block and the guide block have inclined guiding bulges and inclined guiding grooves engaging with each other to guide the baffle block to slide. While the transmission shaft drives the slider to move backward, the hinge shaft following with the slider move backward and slide in the shaft sleeve, thus, the distance of the backward movement of the cores pulled by the core-pulling mechanism is not limited.

20 Claims, 11 Drawing Sheets

CORE-PULLING MECHANISM AND INJECTION MOLD WITH THE SAME

BACKGROUND OF THE INVENTION

1. Field of the Invention

The present invention relates to a core-pulling mechanism for pulling a slide core and a threaded-pin core in an injection mold, and also relates to the injection mold with the core-pulling mechanism capable of molding plastic articles with an internal threaded hole and a big cave.

2. The Related Art

Figure 8:
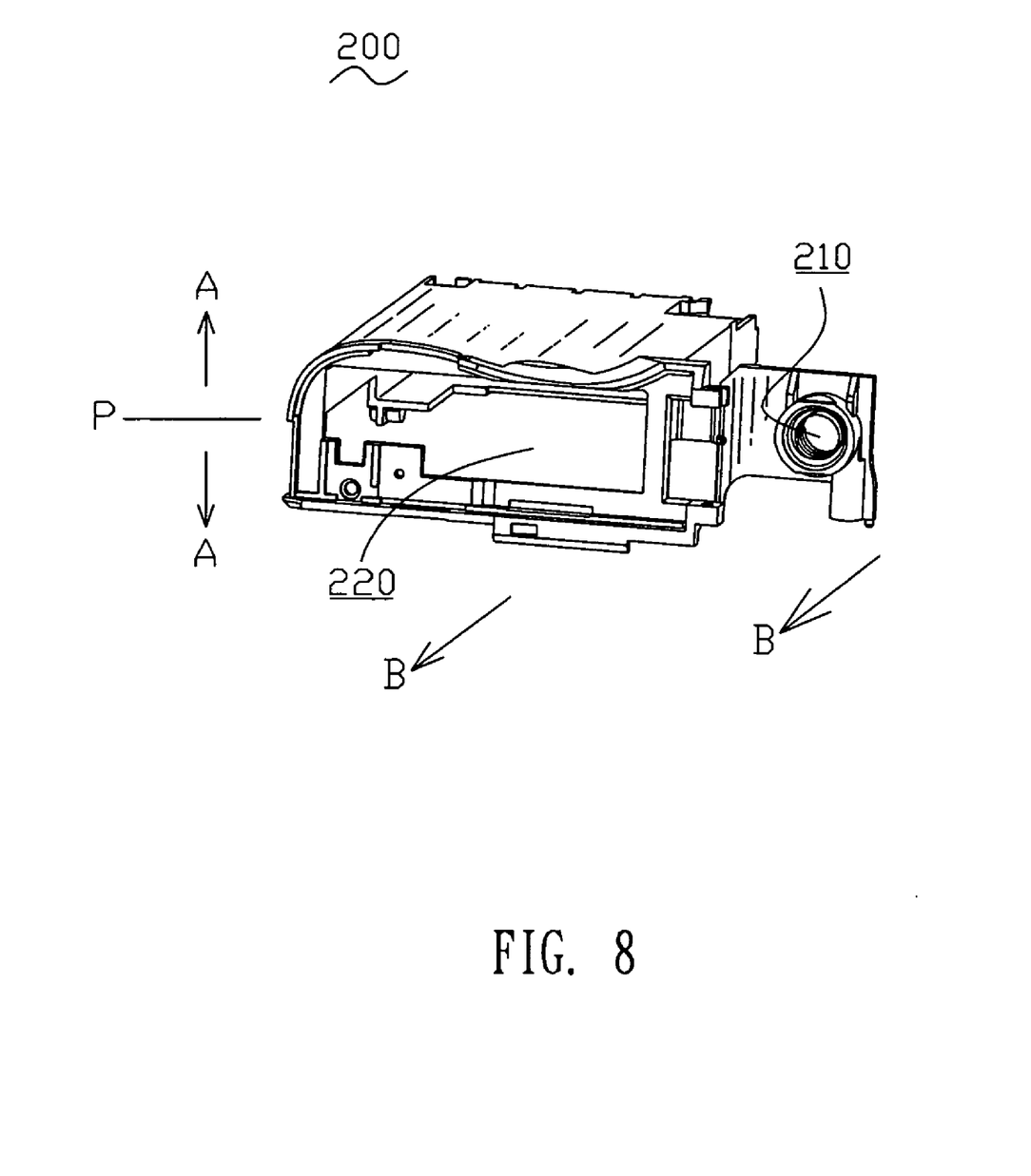
FIG. 8 is a perspective view of a plastic article with an internal threaded hole and a big cave.

A conventional injection mold is convenient for manufacturing complicated plastic articles. As shown in FIG. 8, a parting surface of a plastic article 200 is designated by P, a direction of mold opening is labeled as A-A, and both the directions that the internal threaded hole 210 and the cave 220 open on to are perpendicular to the mold opening direction A-A. In order to mold the plastic article 200, a threaded-pin core and a slide core are needed to mold the internal threaded hole 210 and the cave 220 in a mold cavity of an injection mold. While mold opening, the cores should be pulled out from the mold cavity, so a core-pulling mechanism is needed for pulling the cores out from the mold cavity.

Figure 9:
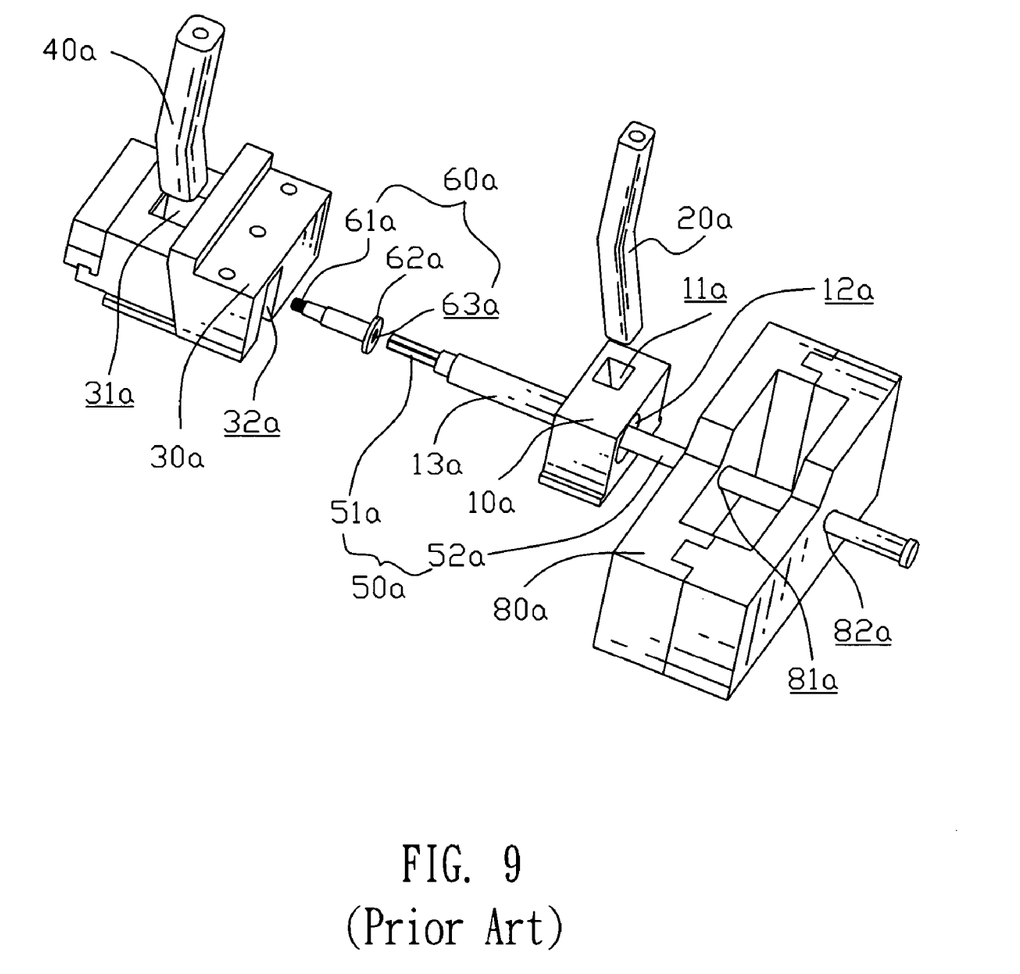
FIG. 9 is a perspective view of a core-pulling mechanism of a prior art.

FIG. 9 shows a conventional core-pulling mechanism. A first inclined guiding slot 11a is defined in a first slider 10a to receive a first inclined pin 20a. A second inclined guiding slot 31a is defined in a second slider 30a to receive a second inclined pin 40a. A hinge shaft 50a has a front rectangular prism end 51a passing through a first hole 12a of the first slider 10a and further passing through a sleeve 13a which is connected to the front wall of the first slider 10a. The hinge shaft 50a further has a rear cylinder end 52a passing through a first rotating hole 81a and a second rotating hole 82a of a base 80a so as to rotate therein. A threaded end 61a of a threaded-pin core 60a is inserted into a second hole 32a of the second slider 30a and received in the mold cavity of the injection mold for molding an internal threaded hole. A rear of the threaded-pin core 60a has a flange 62a withstood by the sleeve 13a and a rectangular cavity 63a defined therein to receive the front rectangular prism end 51a of the hinge shaft 50a.

While the mold opening, the first inclined pin 20a slides out from the first inclined guiding slot 11a and pushes the first slider 10a backward, thus, the sleeve 13a of the first slider 10a and the flange 62a of the threaded-pin core 60a is spaced apart to allow the threaded-pin core 60a to move backward. Then, the hinge shaft 50a is driven to rotate, and the rotation of the hinge shaft 50a drives the threaded-pin core 60a to rotate and move backward until the threaded-pin core 60 is unscrewed out from the molded plastic article. The second inclined pin 40a slides out from the second guiding slot 31a and pushes the second slider 30a backward. Thus, both the threaded-pin core 60a and the second slider 30a are pulled out.

As described in the aforementioned core-pulling mechanism, the hinge shaft 50a rotates in the base 80a without backward movement. A distance S between the front end 51a and the front inner wall of the rectangular cavity 63a should be long enough to provide a space for backward movement of the second slider 30a so as to avoid colliding with the hinge shaft 50a, but the distance S should also be short enough so as to allow the hinge shaft 51a to provide adequate driving force to carry the threaded-pin core 60a to rotate and move backward. Therefore, the distance S decides the moving displacement of the second slider 30a, and the distance S is determined by the angles of the first and second inclined pins 20a, 40a. However, to mold the plastic article 200 as shown in FIG. 8 which has a big cave 220, a slider core for molding the cave 220 is required long enough and needs a long distance travel to be pulled out from the mold cavity. The core-pulling mechanism of the prior art is not qualified to pull the slider core out from the mold cavity with the restriction of the first and second inclined pin 20a, 40a. Additionally, the structures of the first slider 10a and the second slider 30a are so complicated as to result in complicated structures of the injection mold.

SUMMARY OF THE INVENTION

It is therefore an object of the present invention to provide a core-pulling mechanism capable of pulling a slide core and a threaded-pin core in an injection mold to a distance without limitation.

It is another object of the present invention to provide an injection mold having a core-pulling mechanism adapted to mold a plastic article with an internal threaded hole and a big cave and having simple structures.

To achieve the former object, a core-pulling mechanism for pulling a slide core and a threaded-pin core in an injection mold is provided. The slide core defines a mold hole. The threaded-pin core has an external threaded end at a front end and a flange at a rear end. A semi-closed polygonal hole is defined in the rear end of the threaded-pin core. The external threaded end of the threaded-pin core inserts into the mold hole to define an internal-thread molding cavity there-between. A hinge shaft has a front end and an opposite rear end with polygonal cross section respectively. The front end of the hinge shaft is shaped and dimensioned for mating with the polygonal hole of the threaded-pin core. A shaft sleeve has a polygonal aperture extending there-through. The polygonal aperture is shaped and dimensioned to mate with the rear end of the hinge shaft so that the hinge shaft rotates with the shaft sleeve when the shaft sleeve is driven by a first external driving device. A baffle block has an axial through opening to allow the hinge shaft to pass there-through and rotate therein. A slider defines a through hole. A semi-closed transmission hole is defined in a rear wall of the slider, and an inlay cavity is defined in a front wall of the slider. A front portion of the baffle block is inserted in the through hole and withstands the flange of the threaded-pin core. The front end of the hinge shaft passes through the axial through opening and the through hole and inserts into the polygonal hole of the threaded-pin core so that the threaded-pin core rotates with the hinge shaft. The slide core is infixed to the inlay cavity of the slider. A transmission shaft is mounted in the transmission hole of the slider to drive the slider and the slide core backward when the transmission shaft is driven by a second external driving device. A guide block and the baffle block define an inclined guiding groove and an inclined guiding bulge engaging with each other to guide the baffle block to slide.

To achieve the latter object of the present invention, an injection mold assembled with the core-pulling mechanism described above is provided to mold an plastic article with an internal threaded hole and a cave. The injection mold comprises an upper mold, a lower mold, a slide core, a threaded-pin core and a core-pulling mechanism assembled in the injection mold for pulling the slide core and the threaded-pin core. The upper mold has female mold cores. The lower mold disposed under the upper mold has male mold cores. The slide core disposed in the lower mold for molding the cave of the plastic article defines a mold hole. The threaded-pin core has an external threaded end at a front end and a flange at a rear end, and a semi-closed polygonal hole is defined in the rear end. The external threaded end of the threaded-pin core inserts into the mold hole to define an internal-thread molding cavity there-between for molding the internal threaded hole. The slide core, the threaded-pin core, the upper mold and the lower mold are closed to define a mold cavity for molding the plastic article. The guide block is fixed to the upper mold, and the slider is disposed in the lower mold. The slide core is disposed in the mold cavity to mold the cave of the plastic article. The transmission shaft drives the slider together with the slide core and the hinge shaft to move backward until the slide core slides out from the mold cavity. Thus, the internal threaded hole and the cave of the plastic article are molded.

As described above, the hinge shaft slides in the shaft sleeve following the backward movement of the slider and the slide core, so the transmission shaft drives the slide core and slider together with the hinge shaft to move backward to a distance without limitation. Therefore, the injection mold is adapted to mold a plastic article with an internal threaded hole and a big cave.

The above-mentioned and other features and objects of this invention and the manner of attaining them will become more apparent and the invention itself will be better understood by reference to the following description of a preferred embodiment of the invention taken in conjunction with the accompanying figures wherein:

DETAILED DESCRIPTION OF THE PREFERRED EMBODIMENT

Figure 1:
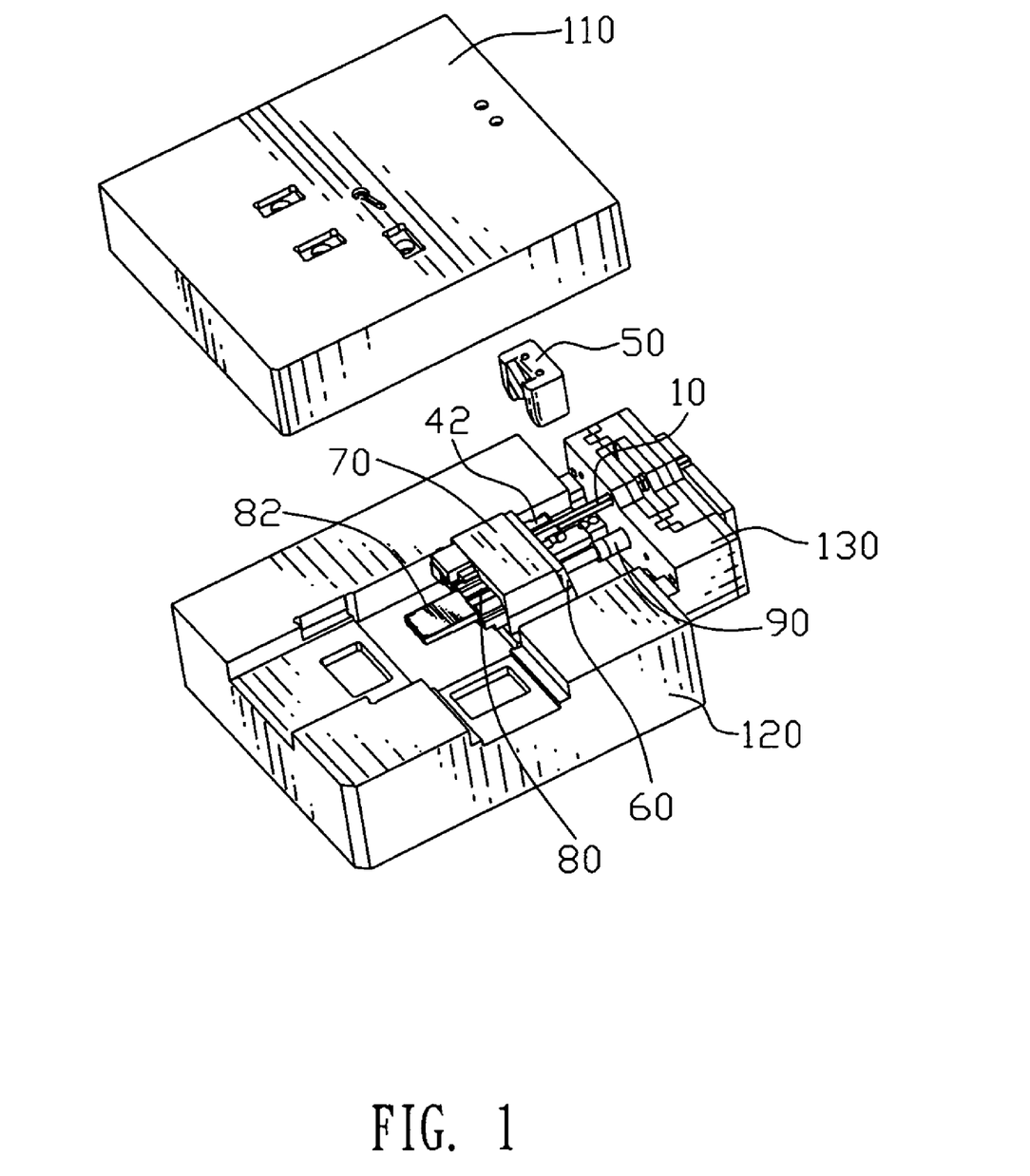
FIG. 1 is a perspective view of an injection mold with a core-pulling mechanism according to the prevent invention.
Figure 2:
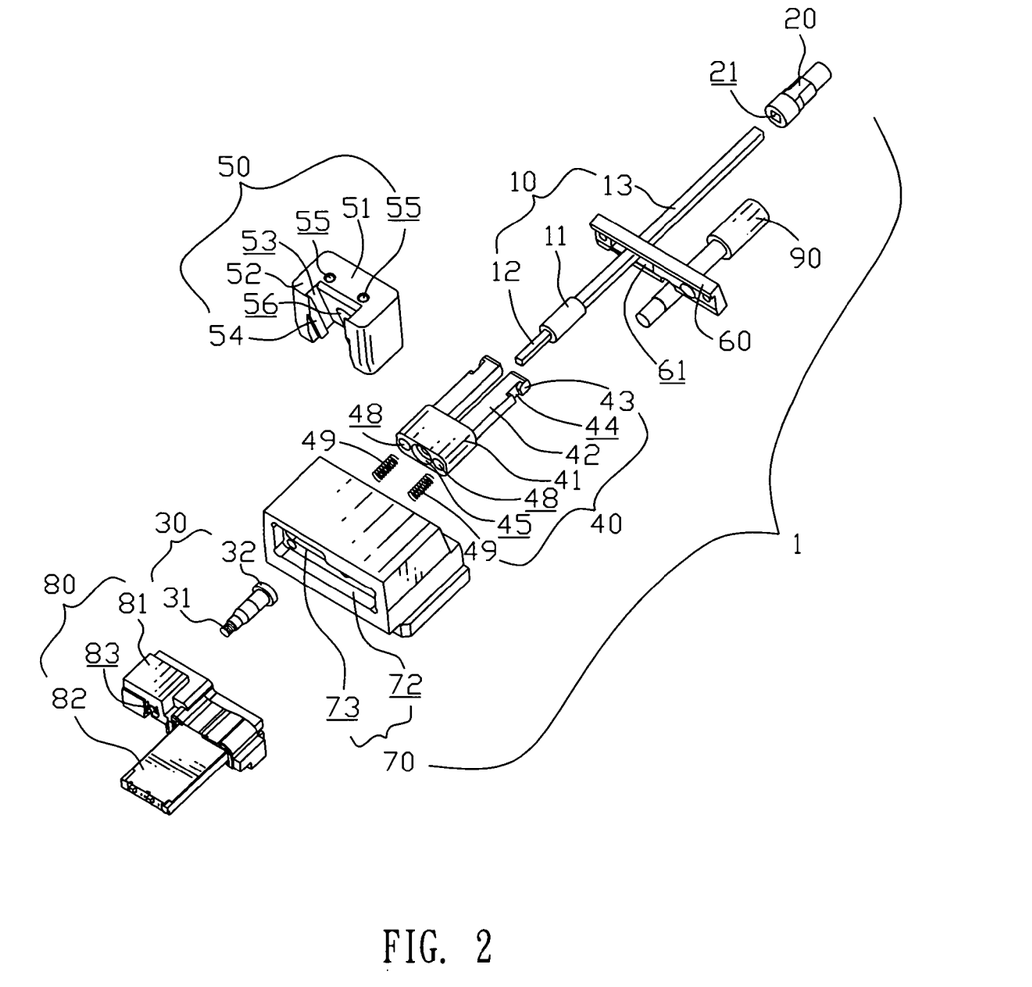
FIG. 2 is an exploded view of the core-pulling mechanism according to the present invention.
Figure 3A:
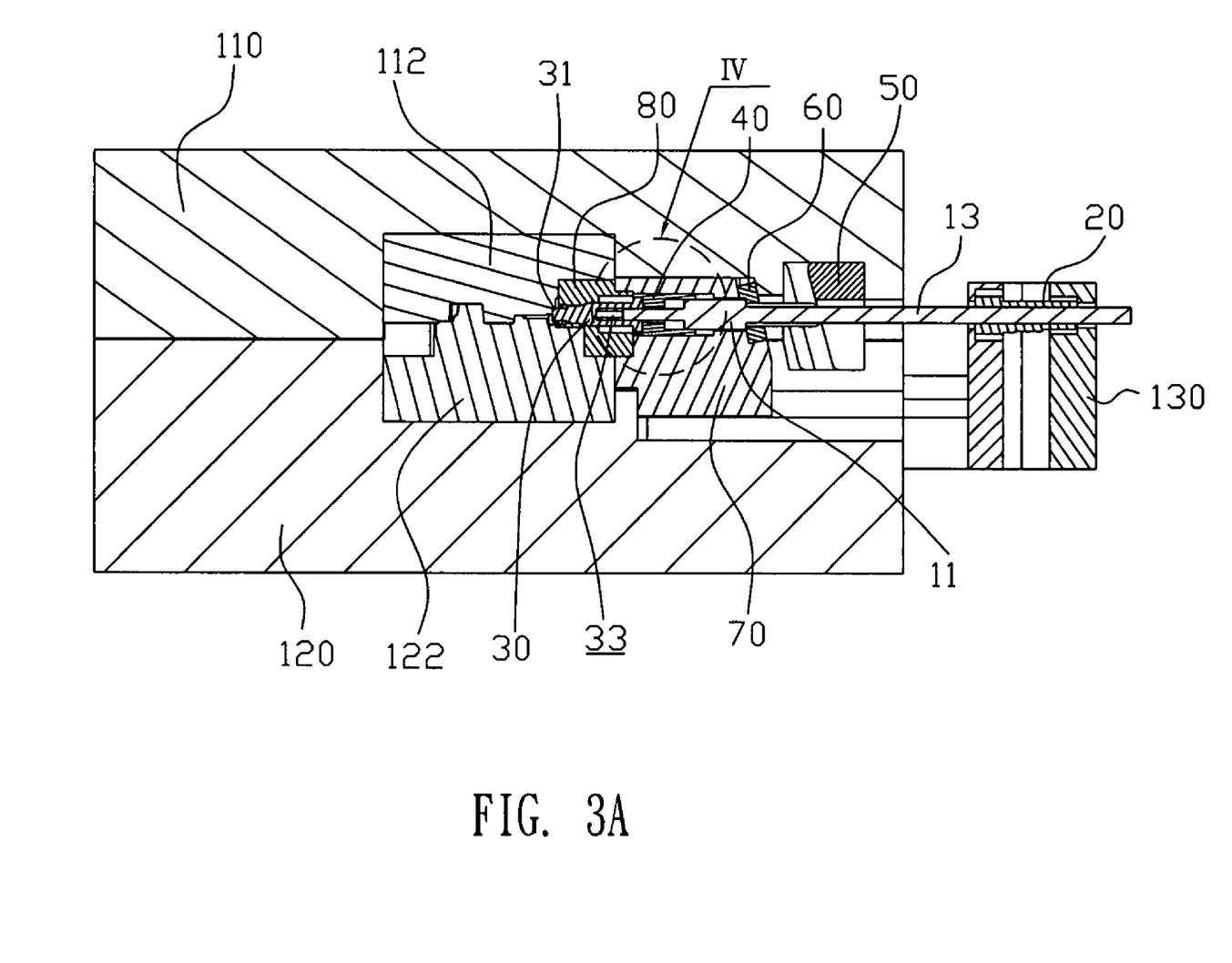
FIGS. 3A and 3B are cross-sectional views illustrating the injection mold in a closing state.

Referring to FIGS. 1, 2 and 3A, a core-pulling mechanism 1 is assembled in an injection mold. The injection mold comprises an upper mold 110 and a lower mold 120 disposed under the upper mold 110. Female mold cores 112 are disposed inside the upper mold 110, and male mold cores 122 are disposed inside the lower mold 120. The core-pulling mechanism 1 is assembled in the injection mold for pulling a slide core 80 and a threaded-pin core 30. The upper mold 110, the lower mold 120, the threaded-pin core 20 and the slide core 80 are closed together to define a mold cavity. Molten plastic materials are injected into the mold cavity to mold the plastic article 200. While the upper and lower molds 110, 120 are opened, the plastic article 200 is ejected from the mold cavity so as to be taken out.

Referring to FIGS. 2 and 3A, the slide core 80 comprises an inlay block 81 and a rectangular insert body 82 extending forward from a portion of the inlay block 81. The insert body 82 inserts into the mold cavity for molding the cave 220 of the plastic article 200. A mold hole 83 is defined inside the other portion of the inlay block 81 for molding the internal threaded hole 210 of the plastic article 200. A front end of the threaded-pin core 30 is an external threaded end 31, and a rear end of the threaded-pin core 30 protrudes a circular flange 32. A polygonal hole 33 is defined in the rear end of the threaded-pin core 30. The threaded end 31 is inserted into the mold hole 83 to define an internal-thread molding cavity so as to mold the internal threaded hole 210 of the plastic article 200 while the upper mold 110 and the lower mold 120 are closed together, Referring to FIG. 2, a hinge shaft 10 of the core-pulling mechanism 1 is a polygonal rod, a middle portion of the hinge shaft 10 is a circular shape protrusion 11, a front end 12 in front of the circular shape protrusion 11 with polygonal cross section is shaped and dimensioned to mate the polygonal hole 33 of the threaded-pin core 30. A rear end 13 behind the circular shaped protrusion 11 of the hinge shaft 10 is polygonal cross section. In this preferred embodiment, both cross sections of the front end 12 and the rear end 13 are rectangular, alternatively, the cross sections of the two ends 12, 13 of the hinge shaft 10 also could be triangular, or hexagonal etc.

A shaft sleeve 20 of the core-pulling mechanism 1 has a polygonal aperture 21 extending there-through. The outer peripheries of two ends of the shaft sleeve 20 are round, and the middle portion of the shaft sleeve 20 is polygonal so as to assemble with a gear of a first external driving device. In this preferred embodiment, the polygonal aperture 21 is shaped and dimensioned to mate the rear end 13 of the hinge shaft 10.

Figure 4:
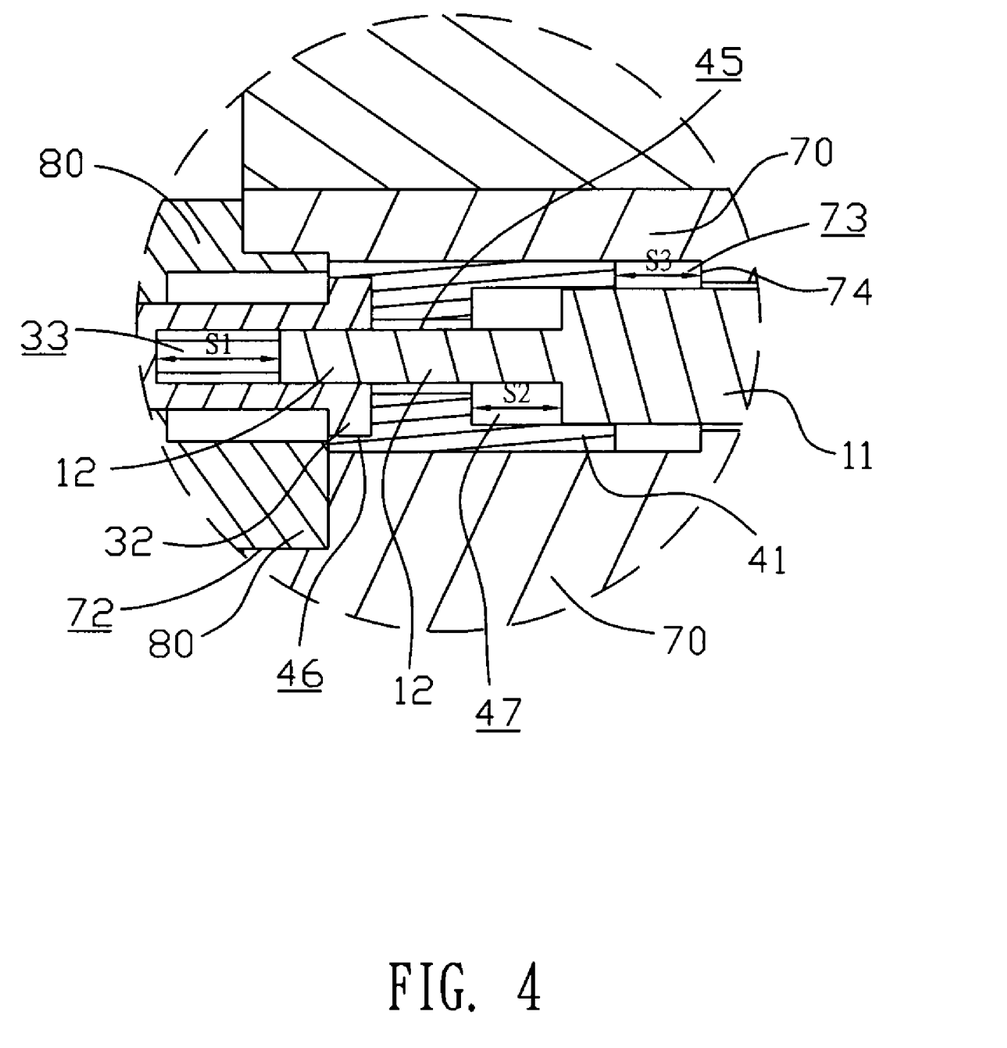
FIG. 4 is a partially enlarged cross-sectional view of the encircled portion marked IV of FIG. 3A.

A baffle block 40 comprises a baffle body 41 and two supporting arms 42 extending rearward from a rear of the baffle body 41. The two supporting arms 42 are separated from each other to define an interval space to allow the circular shape protrusion 11 of the hinge shaft 10 to pass through. A pair of first inclined guiding bulges 43 is protruded from outer sides of rear ends of the two supporting arms 42, and a second inclined guiding grooves 44 is defined in front of each first inclined guiding bulge 43. An axial through opening 45 is defined inside the baffle body 41 to allow the hinge shaft 10 to pass through. As shown in FIG. 4, the front portion of axial through opening 45 is a ladder-shaped hole 46. The ladder-shaped hole 46 is shaped and dimensioned to mate the flange 32 of the threaded-pin core 30. The rear portion of the axial through opening 45 defines a blocking hole 47. The blocking hole 47 is shaped and dimensioned to mate the circular shape protrusion 11 of the hinge shaft 10. A pair of receiving holes 48 is defined in a front wall of the baffle body 41 to receive a pair of springs 49 for urging the baffle block 40 to move backward.

A guide block 50 comprises a guide body 51 and two clips 52 protruded forward from the guide body 51, so the structure of the guide block 50 is U-shaped. A pair of first inclined guiding grooves 53 is defined in inner walls of the two clips 52 corresponding to the pair of the first inclined guiding bulges 43 for engaging with each other. A pair of second inclined bulges 54 is protruded from the inner walls of the two clips 52 in front of the first inclined guiding grooves 53 engaging with the second inclined guiding grooves 44. A pair of fixing hole 55 is defined in a top surface of the guide body 51 so as to fix the guide block 50 to the upper mold 110, and an arched gap 56 is defined in the lower portion of the guide body 51 shaped like an inverted U to allow the hinge shaft 10 to pass through.

A wear-resisting block 60 defines a cutting hole 61 extending there-through. The cutting hole 61 is shaped and dimensioned to mate the two supporting arms 42 of the baffle block 40 to allow the two supporting arms 42 to pass through. The wear-resisting block 60 abuts against the baffle body 41 and the rear wall of the circular shaped protrusion 11 of the hinge shaft 10, thus to block the baffle body 41.

A slider 70 is a rectangular block and disposed in the lower mold 120. A through hole 73 is defined in the slider 70. As shown in FIG. 4, an inlay cavity 72 is defined in a front wall of the slider 70. The rear of inlay block 81 is ladder-like so as to be inlayed in the inlay cavity 72 and fixed to the slider 70. The inner wall of the through hole 73 protrudes downward to form a step 74, and the baffle body 41 is disposed in the through hole 73 and moves in front of the step 74. The step 74 withstands the rear wall of the baffle body 41 so as to prevent the baffle block 40 from further moving backward. That is to say, the baffle body 41 is disposed in the through hole 73 in front of the step 74, and two supporting arms 42 are disposed in the through hole 73 behind the step 74, and the circular shape protrusion 11 moves in the through hole 74. A semi-closed transmission hole 75 is defined in a rear wall of the slider 70.

A transmission shaft 90 provides a driving force to the core-pulling mechanism 1. A front end of the transmission shaft 90 is disposed in the semi-closed circular transmission hole 75 and fixed to the slider 70, a rear end of the transmission shaft 90 is assembled with a second external driving device so that the transmission shaft 90 provides driving forces for the slider 70 and the slide core 80 to move backward.

Referring to FIG. 3A, the core-pulling mechanism 1 is assembled in the injection mold. The guide block 50 is fixed to the upper mold 110 with screws assembled in the fixing hole 55. The rear end 13 of the hinge shaft 10 passes through the shaft sleeve 20. Two ends of the shaft sleeve 20 are respectively assembled with a bearing, and the two bearings are fixed to a base 130 so as to assemble the hinge shaft 10 in the base 130. The middle portion of the shaft sleeve 20 is assembled with gears of the first external driving device. The hinge shaft 10 not only rotate following with the shaft sleeve 20 but also slide backward or forward in the polygonal aperture 21 of the shaft sleeve 20.

Together with reference to FIG. 4, the baffle body 41 is assembled in the through hole 73 of the slider 70 with the two supporting arms 42 extending out from the rear of the slider 70. The front end 11 of the hinge shaft 10 passes through the interval space between the two supporting arms 42 and inserts into the axial through opening 45. The circular shape protrusion 11 is disposed in the blocking hole 47. The circular flange 32 of the threaded-pin core 30 is positioned in the ladder-shaped hole 46 and withstood by the baffle body 41. The front end 12 of the hinge shaft 10 inserts into the polygonal hole 33 of the threaded-pin core 30, and the threaded-pin core 30 is assembled in the mold hole 83 of the slide core 80 with a bearing and thus to be slide in the bearing. The external threaded end 31 is disposed in the mold hole 83. The rear of the inlay block 81 is infixed to the inlay cavity 72 of the slide block 70 and the insert body 82 is disposed in the mold cavity. The wear-resisting block 60 is fixed to the rear of the slide block 70.

Accordingly, the process that the core-pulling mechanism 1 pulls the cores backward movement will be described in details with reference to from FIG. 3 to FIG. 7.

Referring to FIG. 3A, the insert body 82 of the slide core 80 is disposed in the mold cavity to mold the cave 220 of the plastic article 200. The external threaded end 31 of the threaded-pin core 30 inserts into the mold hole 83 so as to mold the internal threaded hole 210, the length of the threaded end 31 is S0 which equals a depth of the internal threaded hole 210 of the plastic article 200.

Together with reference to the FIG. 4, a distance between the front tip of the hinge shaft 10 and the front inner wall of the polygonal hole 33 is S1 and S1>S0. A distance between the front wall of the circular shaped protrusion 11 and the front wall of the blocking hole 47 is S2, and S0<S2<S1. A distance between the rear wall of the baffle body 41 and the front wall of the step 74 of the block 40 is S3, and S3≦S2. The first inclined guiding bulges 43 are respectively received in the first inclined guiding grooves 53 of the guide block 50, while the pair of the second inclined guiding bulges 54 is received in the pair of the second inclined guiding grooves 44. The wear-resisting block 60 is fixed to the rear of the slide block 70 and abuts against the circular shaped protrusion 11 of the hinge shaft 10.

Figure 3B:
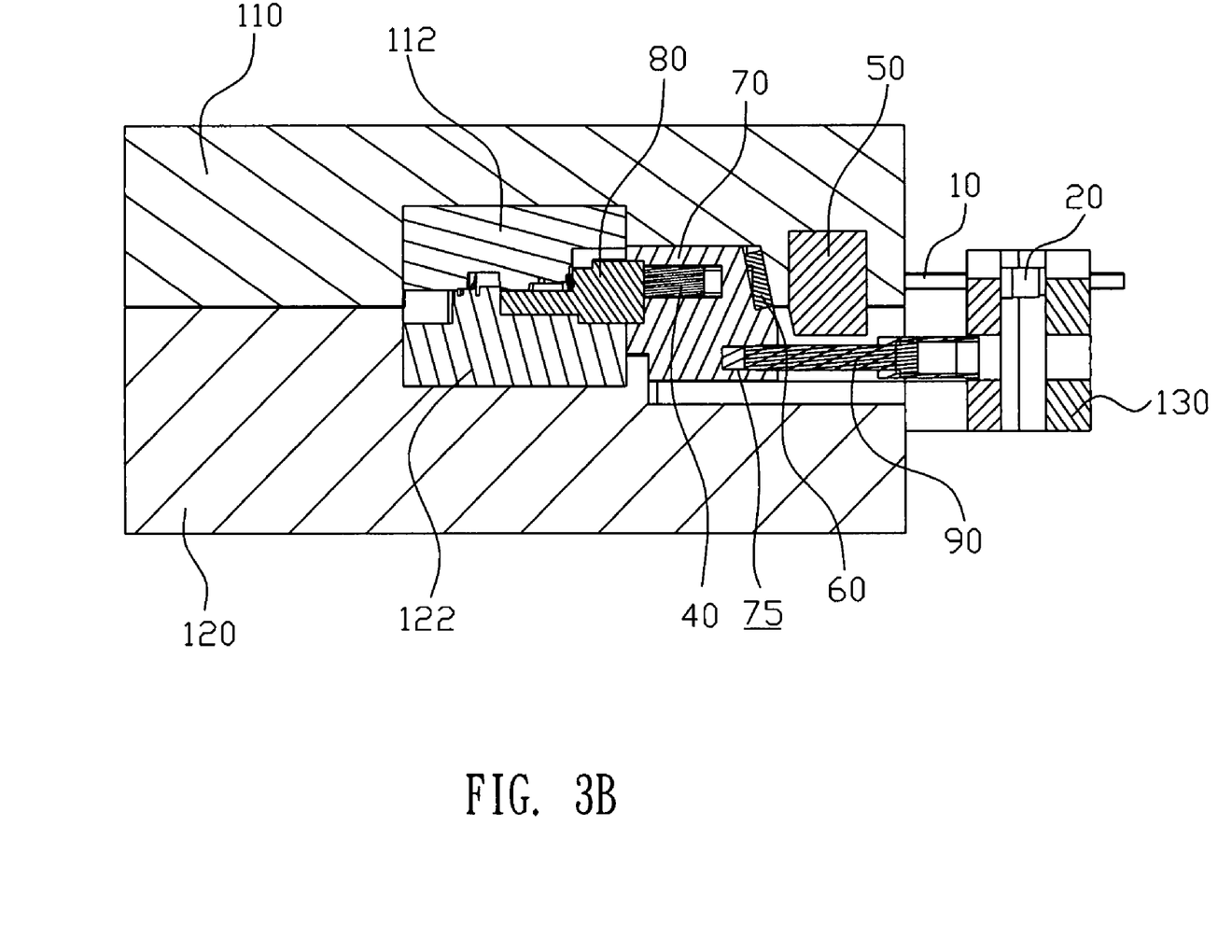

Referring to FIG. 3B, the front end of the transmission shaft 90 is mounted in the semi-closed transmission hole 75 and fixed to the slide block 70, and the rear end of the transmission shaft 90 is assembled with the second external driving device and assembled in the base 130.

Figure 5:
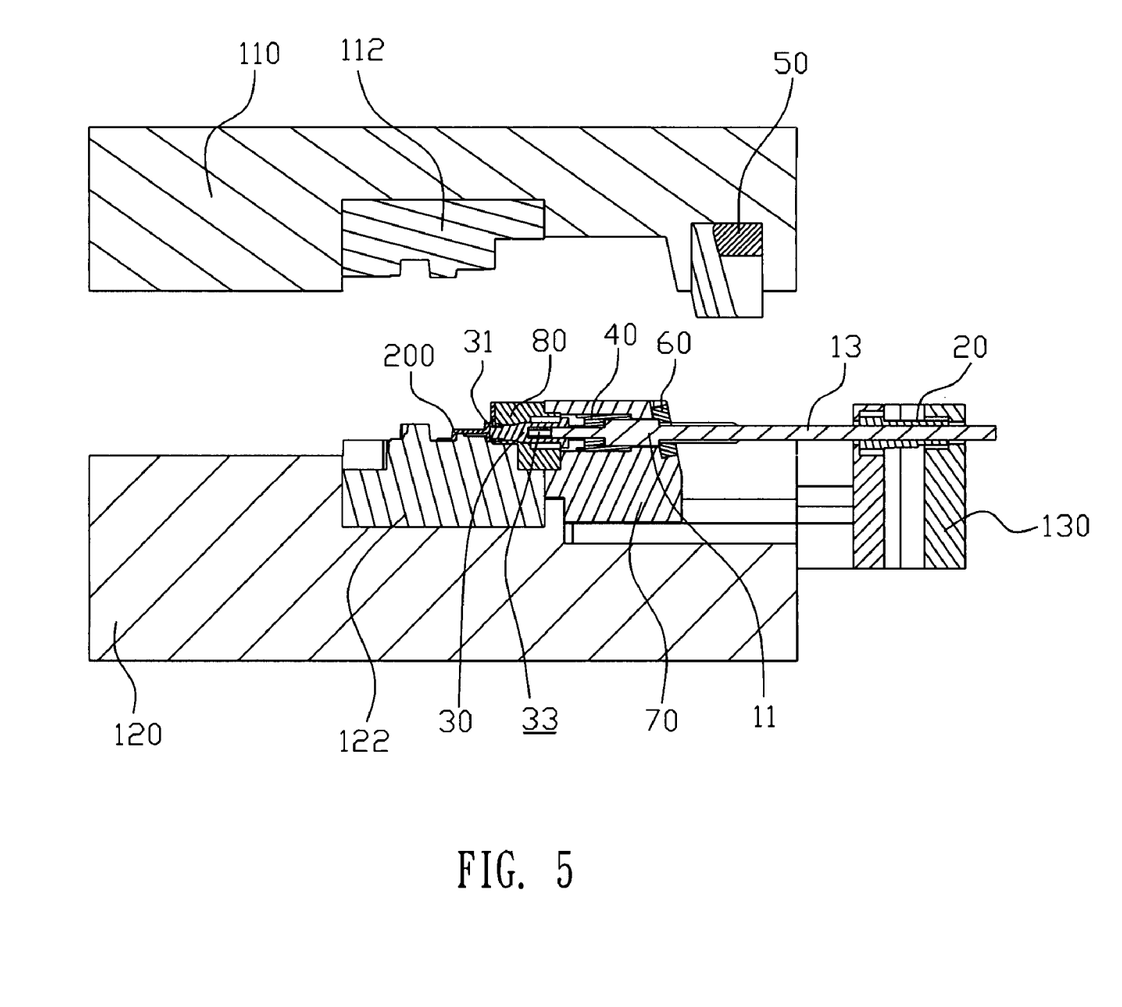
FIG. 5 is a cross-sectional view illustrating the injection mold in an opening state where a guide block of the core-pulling mechanism is separated from a baffle block of the core-pulling mechanism.

Referring to FIG. 5, while the injection mold opening, the lower mold 120 moves downward, the first inclined guiding bulges 43 slide downward in the first inclined guiding grooves 53, while the second inclined guiding bulges 54 slide upward in the second inclined guiding grooves 44. Since the first inclined guiding bulges 43 are sliding slantingly in the first inclined guiding grooves 53, the guide block 50 pulls the baffle block 40 to move backward. The baffle body 41 of the baffle block 40 slides backward in the through hole 73 of the slide block 70. When the backward moving displacement of the baffle block 40 reaches S3, the rear wall of the baffle body 41 abuts against the step 74 so as to be prevented from further moving backward. For the pair of springs 49 is received in the receiving hole 48, the two ends of each spring 49 respectively prop the baffle block 40 and the flange 32 of the threaded-pin core 30 so as to define a redundant distance S4 there-between. Since S3≦S2, the front wall of the circular shaped protrusion 11 and the front wall of the blocking hole 47 are still spaced out a certain distance. At this moment, the guide block 50 is completely separated from the baffle block 40, and the upper mold 110 and lower mold 120 are separated from each other.

In order to assure the backward moving displacement of the baffle block 40, when the baffle block 40 and the guide block 50 are separated, the pair of springs 49 assists to push the baffle block 40 to the distance S3. The wear-resisting block 60 abuts against the circular shape protrusion 11 so as to prevent the hinge shaft 10 being sprung out from the axial through opening 45.

Figure 6:
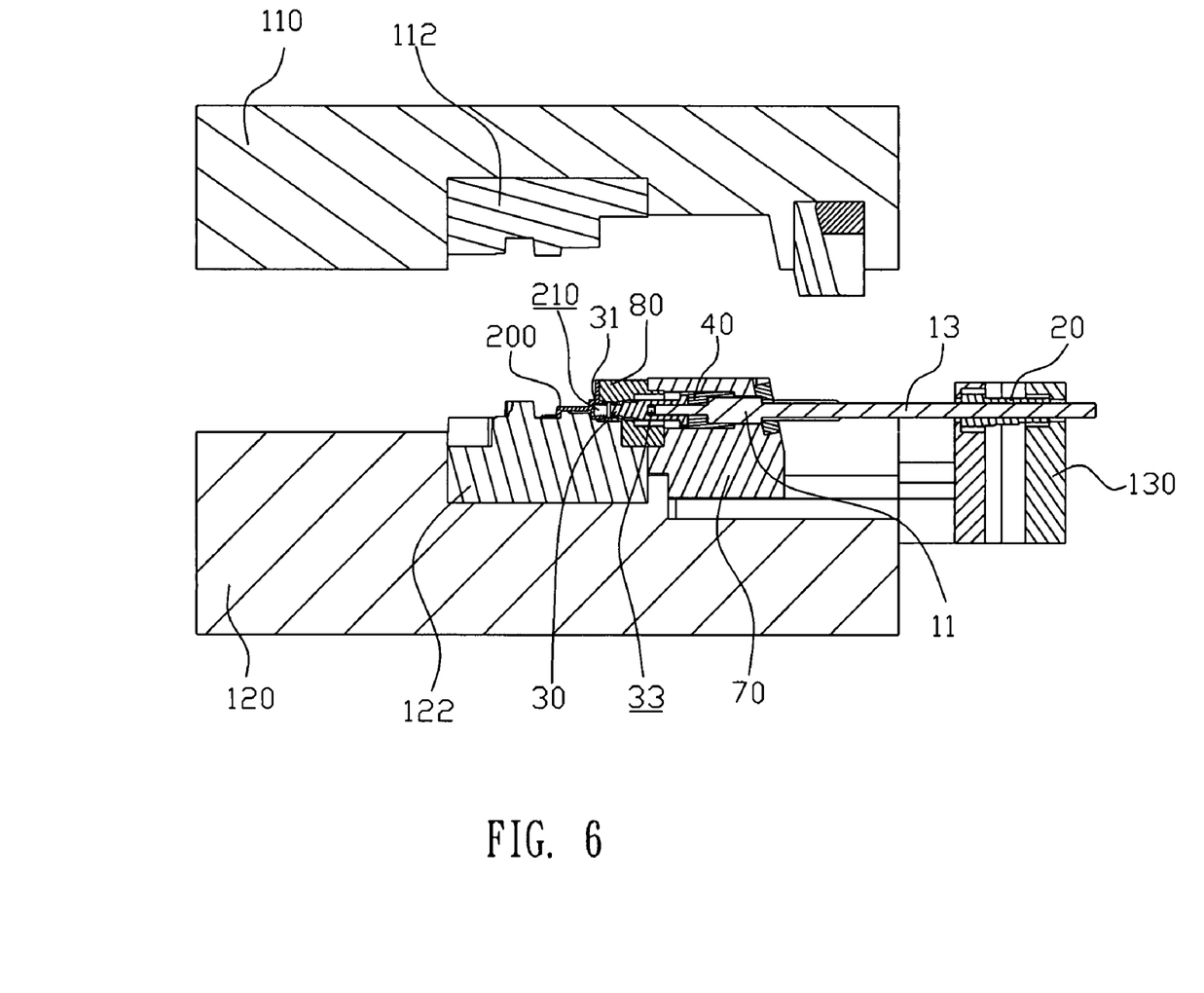
FIG. 6 is a cross-sectional view illustrating the injection mold in an opening state where a threaded-pin core of the core-pulling mechanism is unscrewed from a mold cavity of the injection mold.

Referring to FIG. 6, after the upper mold 110 and the lower mold 120 are separated, the first external driving device drives the hinge shaft 10 to rotate, and the threaded-pin core 30 is rotated by the hinge shaft 10 for the front end 12 of the hinge shaft 10 being inserted into the polygonal hole 33 of the threaded-pin core 30. While the external threaded end 31 rotates inside the internal threaded hole 210 of the plastic article 200, the external threaded end 31 bears backward pushing forces coming from the internal threaded hole 210, so the threaded-pin core 30 is pushed to move backward along the front end 12 of the hinge shaft 10 until the threaded end 31 is pulled out from the internal threaded hole 210. The backward moving displacement of the threaded end 31 is S0, for S1>S0, the polygonal hole 33 of the threaded-pin core 30 still spaces away from the front tip of the hinge shaft 10.

Figure 7A:
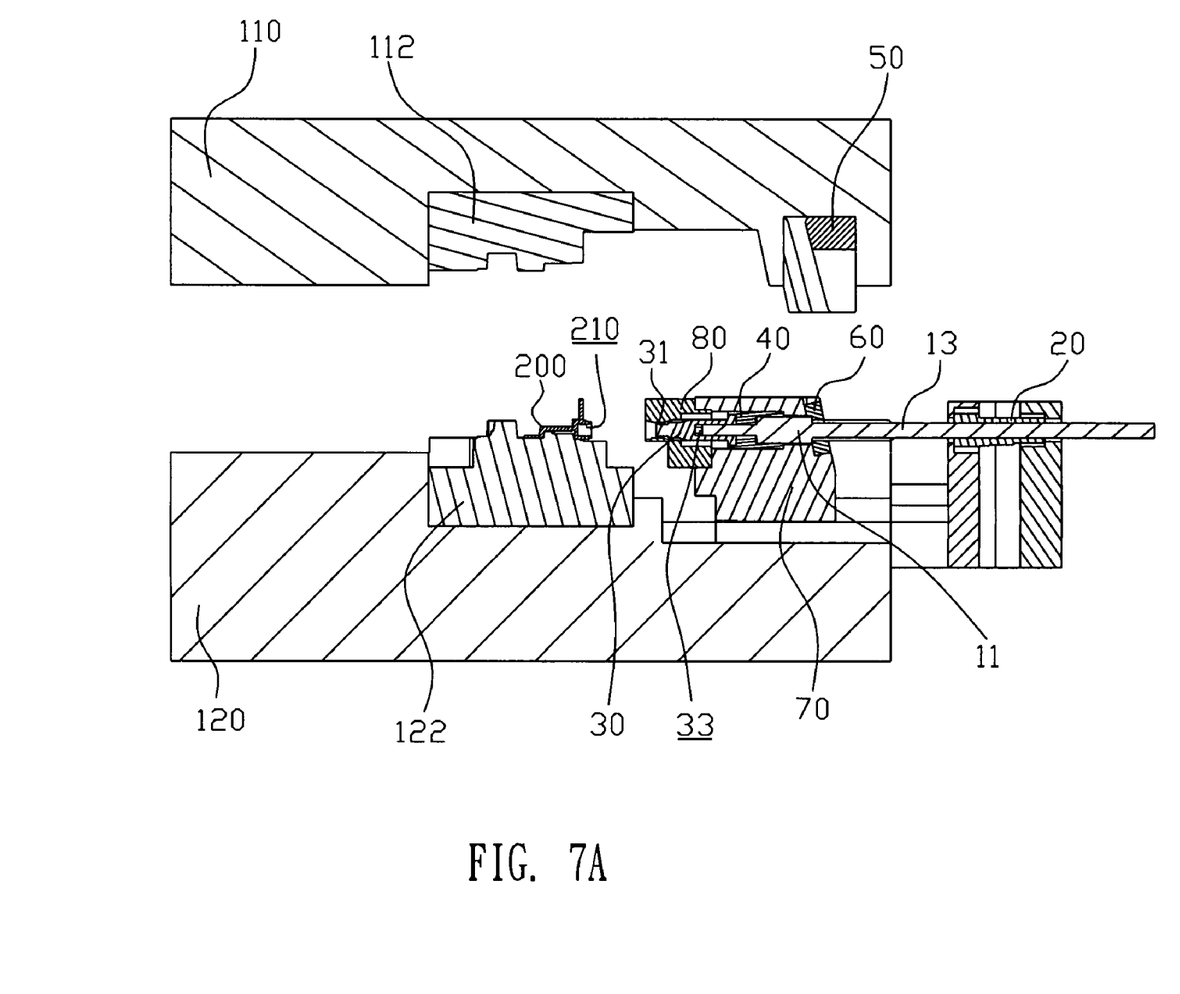
FIGS. 7A and 7B are cross-sectional views illustrating the injection mold in an opening state where a slide core of the core-pulling mechanism is pulled out from the mold cavity of the injection mold.
Figure 7B:
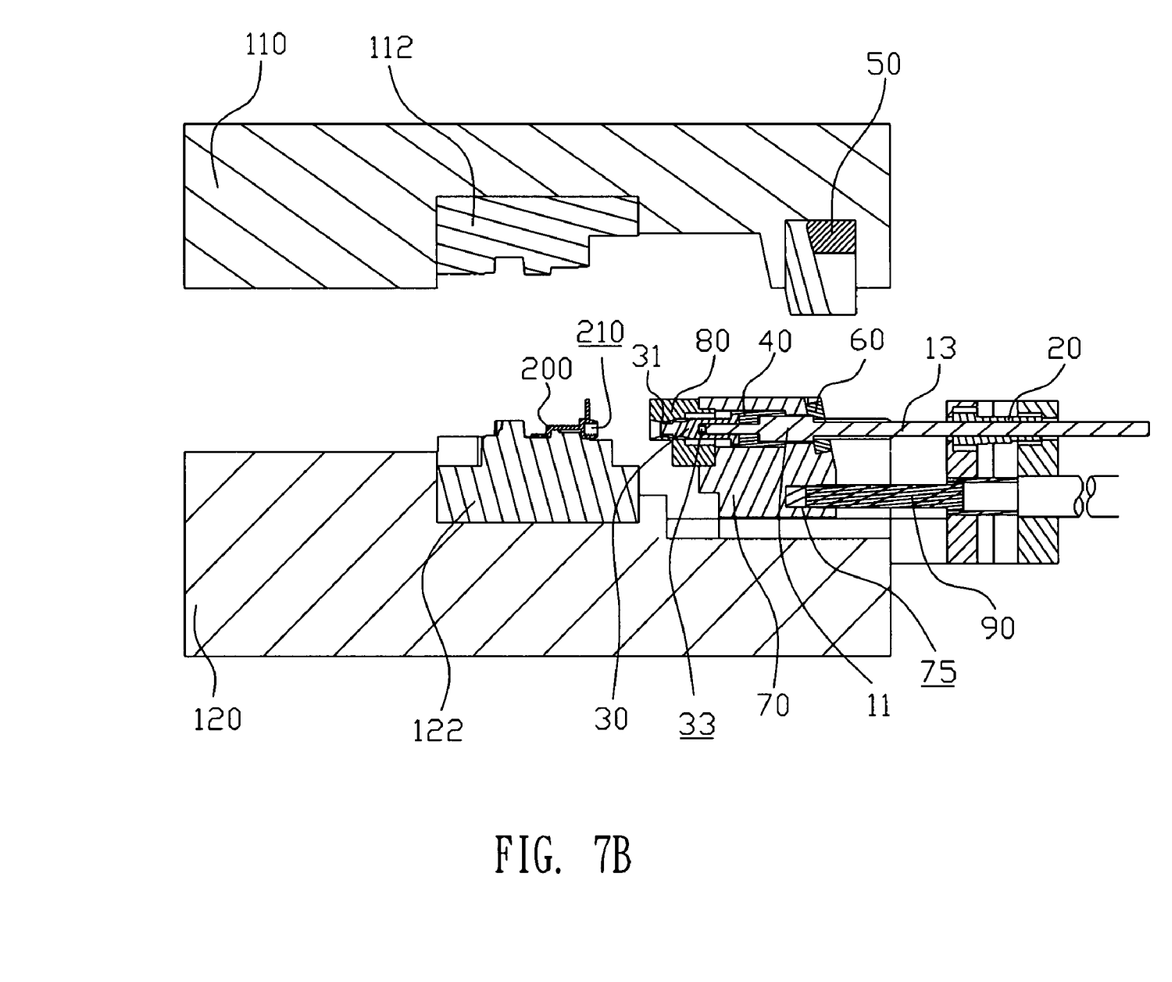

Referring to FIGS. 7A and 7B, the second external driving device drives and pulls the transmission shaft 90 to move backward, and the transmission shaft 90 carries the slider 70 to move backward. Both the slide core 80 and the wear-resisting block 60 fixing to the slider 70 also move backward under the driving force of the transmission shaft 90. Since the threaded-pin core 30 is received in the mold hole 83 of the slide core 80, the slide core 80 carries the threaded-pin core 30 to move backward, the flange 32 of the threaded-pin core 30 abuts against the rear wall of the ladder-shaped hole 46 so as to push the baffle block 40 to move backward. Additionally, the pair of springs 49 positioned between the flange 32 and the baffle block 40 assists to push the baffle block 40 to move backward. While the baffle block 40 moves backward, the front wall of the blocking hole 47 abuts against the front wall of the circular shaped protrusion 11 so as to push the hinge shaft 10 moving backward following the backward moving of the slider 70 which is driven by the transmission shaft 90. The rear end 13 of the hinge shaft 10 is disposed in the shaft sleeve 20, so the hinge shaft 10 moves and slides backward in the shaft sleeve 20. That is to say, the hinge shaft 10 following the slide block 70, the mold core 80, the threaded-pin core 30, the wear-resisting block 60 and the baffle block 40 under the driving force of the transmission shaft 90 moves backward to a predetermined position. The transmission shaft 90 drives the slider 70 to move backward until the insert body 82 of the slide core 80 completely exit from the cave 220 of the plastic article 200, then the plastic article 200 is taken out from the mold cavity.

In brief, during the backward movement of the core-pulling mechanism 1 of this present invention, firstly, the baffle block 40 moves backward to leave the redundant space S4. Secondly, the first external driving device drives the hinge shaft 10 to rotate the threaded-pin core 30 to exit from the internal threaded hole 210 of the plastic article 200. Then, the second external driving force drives the transmission shaft 90, the slider 70, the slide core 80, the wear-resisting block 60, the baffle block 40, the hinge shaft 10 and the threaded-pin core 30 move backward to a predetermined position until the insert body 82 slides out from the cave 220 of the plastic article 200.

According to the present invention, the rear end 13 of the hinge shaft 10 is assembled in the shaft sleeve 20, while the slider 70 driven by the transmission shaft 90 moves backward, the hinge shaft 10 moves backward and slides in the shaft sleeve 20 following the backward movement of the slider 70, therefore, the hinge shaft 10 moves together with the slider 70 to a predetermined position until the insert body 82 completely slides from the cave 220. Thus, the transmission shaft 90 of the core-pulling mechanism 1 pulls the slider 70 together with the hinge shaft 10 to move backward and the distance of the backward movement of the slide core 80 and the slider 70 is not limited. Additionally, the injection mold applies the core-pulling mechanism 1 instead of the first and second inclined pins 20a, 40a of the prior art to pull the threaded-pin core 30 and the slider core 80 thus to simplify structures of the injection mold.

Accordingly, there has been disclosed a core-pulling mechanism and an injection mold with the core-pulling mechanism. While an illustrated embodiment of this invention has been disclosed herein, it is understood that various modifications and adaptations to the disclosed embodiment are possible, and it is intended that this invention be limited only by the scope of the appended claims.

What is claimed is:

1. A core-pulling mechanism for pulling a slide core and a threaded-pin core in an injection mold, the slide core defining a mold hole, the threaded-pin core having an external threaded end at a front end thereof and a flange at a rear end thereof, and a semi-closed polygonal hole defined in the rear end thereof, the external threaded end of the threaded-pin core inserting into the mold hole to define an internal-thread molding cavity there-between, the core-pulling mechanism comprising:

a hinge shaft having a front end and an opposite rear end with polygonal cross section respectively, the front end of the hinge shaft being shaped and dimensioned for mating with the polygonal hole of the threaded-pin core;

a shaft sleeve having a polygonal aperture extending there-through, the polygonal aperture being shaped and dimensioned to mate with the rear end of the hinge shaft so that the hinge shaft rotates with the shaft sleeve when the shaft sleeve is driven by a first external driving device;

a baffle block having an axial through opening to allow the hinge shaft to pass there-through and rotate therein;

a slider, a through hole being defined in the slider, a semi-closed transmission hole being defined in a rear wall of the slider, an inlay cavity being defined in a front wall of the slider, a front portion of the baffle block being inserted in the through hole and withstanding the flange of the threaded-pin core, the front end of the hinge shaft passing through the axial through opening and the through hole and inserting into the polygonal hole of the threaded-pin core so that the threaded-pin core rotates with the hinge shaft, said slide core being infixed to the inlay cavity of the slider;

a transmission shaft mounted in the transmission hole of the slider to drive the slider and the slide core backward when the transmission shaft is driven by a second external driving device; and a guide block, the guide block and the baffle block defining an inclined guiding groove and an inclined guiding bulge engaging with each other to guide the baffle block to slide.

2. The core-pulling mechanism as claimed in claim 1, wherein said baffle block further comprises a baffle body and two supporting arms protruding from a rear of the baffle body, the two supporting arms are separated from each other to define an interval space to allow the hinge shaft to pass through, a pair of first inclined guiding bulges are protruded from outer sides of rear ends of the two supporting arms, said guide block further comprises a guide body and two clips protruded forward from the guide body, and a pair of first inclined guiding grooves is defined in inner walls of the two clips corresponding to the pair of first inclined guiding bulges.

3. The core-pulling mechanism as claimed in claim 2, wherein a pair of second inclined guiding grooves is defined in front of the first inclined guiding bulges of the baffle block, a pair of second inclined guiding bulges is protruded from the inner walls of the two clips in front of the first inclined guiding grooves of the guide block for engaging with the pair of second inclined guiding grooves.

4. The core-pulling mechanism as claimed in claim 2, wherein the inner wall of the through hole of the slider forms a step, the baffle body is received in the through hole and moves in front of the step, the step withstands the rear wall of the baffle body.

5. The core-pulling mechanism as claimed in claim 2, wherein a middle portion of the hinge shaft is circular shape, and a corresponding portion of the axial through opening of the baffle block is shaped to match with the circular protrusion hinge shaft and allow the hinge shaft to rotate therein.

6. The core-pulling mechanism as claimed in claim 5, further comprising a wear-resisting block fixed to the rear of the slider and abutting against the rear wall of the circular portion of the hinge shaft, wherein a cutting hole is defined in the wear-resisting block to allow said two supporting arms to pass through.

7. The core-pulling mechanism as claimed in claim 1, wherein the cross section of said front end of the hinge shaft is rectangular, and the cross section of said polygonal hole is rectangular.

8. The core-pulling mechanism as claimed in claim 1, wherein the cross section of said rear end of the hinge shaft is rectangular, and the cross section of the polygonal aperture is rectangular.

9. The core-pulling mechanism as claimed in claim 1, wherein the front portion of the axial through opening is ladder-shaped for receiving the flange of the threaded-pin core.

10. The core-pulling mechanism as claimed in claim 1, further comprising a pair of springs and a pair of receiving holes defined in a front wall of the baffle block for receiving the pair of springs.

11. An injection mold for molding a plastic article with an internal threaded hole and a cave, comprising:
an upper mold having female mold cores therein;
a lower mold having male mold cores therein, the lower mold being disposed under the upper mold;
a slide core disposed in the lower mold for forming said cave of the plastic article, a mold hole being defined in the slide core;
a threaded-pin core having an external threaded end at a front end thereof and a flange at a rear end thereof, and a semi-closed polygonal hole defined in the rear end thereof, the external threaded end of the threaded-pin core inserting into the mold hole to define an internal-thread molding cavity there-between for molding said internal threaded hole, the slide core, the threaded-pin core, the upper mold and the lower mold being closed to define a mold cavity for molding said plastic article; and
a core-pulling mechanism for pulling said slide core and said threaded-pin core, the core-pulling mechanism comprising:
a hinge shaft having a front end and an opposite rear end with polygonal cross section respectively, the front end of the hinge shaft being shaped and dimensioned for mating with the polygonal hole of the threaded-pin core;
a shaft sleeve having a polygonal aperture extending there-through, the polygonal aperture being shaped and dimensioned to mate with the rear end of the hinge shaft so that the hinge shaft rotates with the shaft sleeve when the shaft sleeve is driven by a first external driving device;
a baffle block having an axial through opening to allow the hinge shaft to pass there-through and rotate therein;
a slider disposed in the lower mold, a through hole being defined in the slider, a semi-closed transmission hole being defined in a rear wall of the slider, an inlay cavity being defined in a front wall of the slider, a front portion of the baffle block being inserted in the through hole and withstanding the flange of the threaded-pin core, the front end of the hinge shaft passing through the axial through opening and the through hole and inserting into the polygonal hole of the threaded-pin core so that the threaded-pin core rotates with the hinge shaft, said slide core being infixed to the inlay cavity of the slider;
a transmission shaft mounted in the transmission hole of the slider to drive the slider and the slide core backward when the transmission shaft is driven by a second external driving device; and
a guide block fixed to the upper mold, the guide block and the baffle block defining an inclined guiding groove and an inclined guiding bulge engaging with each other to guide the baffle block to slide.

12. The injection mold as claimed in claim 11, wherein said baffle block further comprises a baffle body and two supporting arms protruding from a rear of the baffle body, the two supporting arms are separated from each other to define an interval space to allow the hinge shaft to pass through, a pair of first inclined guiding bulges are protruded from outer sides of rear ends of the two supporting arms, said guide block further comprises a guide body and two clips protruded forward from the guide body, and a pair of first inclined guiding grooves is defined in inner walls of the two clips corresponding to the pair of first inclined guiding bulges.

13. The injection mold as claimed in claim 12, wherein a pair of second inclined guiding grooves is defined in front of the first inclined guiding bulges of the baffle block, a pair of second inclined guiding bulges is protruded from the inner walls of the two clips in front of the first inclined guiding grooves of the guide block for engaging with the pair of second inclined guiding grooves.

14. The injection mold as claimed in claim 12, wherein the inner wall of the through hole of the slider forms a step, the baffle body is received in the through hole and moves in front of the step, the step withstands the rear wall of the baffle body.

15. The injection mold as claimed in claim 12, wherein a middle portion of the hinge shaft is circular shape, and a corresponding portion of the axial through opening of the baffle block is shaped to match with the circular protrusion hinge shaft and allow the hinge shaft to rotate therein.

16. The injection mold as claimed in claim 15, further comprising a wear-resisting block fixed to the rear of the slider and abutting against the rear wall of the circular portion of the hinge shaft, wherein a cutting hole is defined in the wear-resisting block to allow said two supporting arms to pass through.

17. The injection mold as claimed in claim 11, wherein the cross section of said front end of the hinge shaft is rectangular, and the cross section of said polygonal hole is rectangular.

18. The injection mold as claimed in claim 11, wherein the cross section of said rear end of the hinge shaft is rectangular, and the cross section of the polygonal aperture is rectangular.

19. The injection mold as claimed in claim 11, wherein said slide core further comprises an rectangular insert body and a inlay block, said insert body is extended from a portion of the inlay block, said mold hole is defined in the other portion of the inlay block.

20. The injection mold as claimed in claim 11, wherein the front portion of the axial through opening is ladder-shaped for receiving the flange of the threaded-pin core.

* * * * *